April 1, 1969 G. ALEXANDROVICH ET AL 3,436,674

GAIN CONTROL DEVICE FOR HIGH FIDELITY AUDIO SYSTEMS

Original Filed May 17, 1962

INVENTORS
GEORGE ALEXANDROVICH
DONALD J. PLUNKETT

BY Darby & Darby

ATTORNEYS

United States Patent Office 3,436,674
Patented Apr. 1, 1969

3,436,674

GAIN CONTROL DEVICE FOR HIGH FIDELITY AUDIO SYSTEMS

George Alexandrovich, Richmond Hill, and Donald J. Plunkett, New Rochelle, N.Y., assignors to Fairchild Recording Equipment Corporation, Long Island City, N.Y., a corporation of New York Continuation of application Ser. No. 195,637, May 17, 1962. This application Mar. 14, 1966, Ser. No. 536,566
Int. Cl. H03g *3/20;* H03f *17/00*
U.S. Cl. 330—59 17 Claims This invention relates to gain control devices, and more particularly to a novel gain control device for expanding or compressing the dynamic range of audio signals in high fidelity systems and the like.

Figure 1:
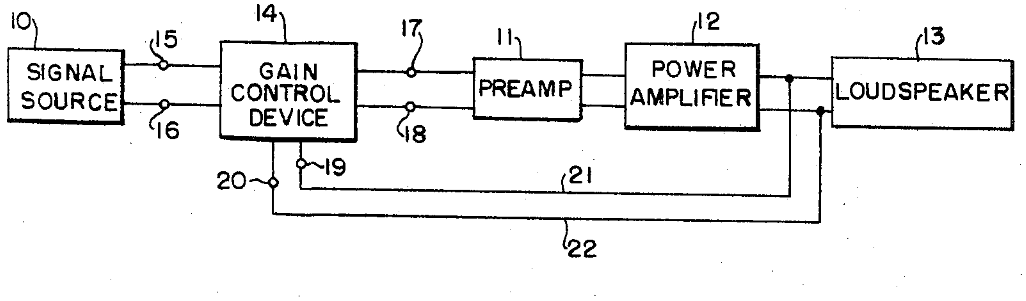

This application is a continuation of our application Ser. No 195,637 filed May 17, 1962, now abandoned.

In modern high fidelity audio systems, more popularly known as "Hi-Fi" systems, an attempt is made to reproduce recorded or broadcast program material with such a high degree of fidelity as to virtually recreate the original performance. To this end the system components, such as tuners, amplifiers, loudspeakers, etc., are carefully designed to transmit the audio signals comprising the recorded or broadcast program material in a manner to avoid distortion and to provide a true reproduction of the original program material. Unfortunately, complete realism and faithful reproduction of original performance dynamics may not always be obtained because of certain limitations imposed upon the audio signals during the process of recording or broadcasting. For example, during the recording of phonograph records, the audio signals representing the program material being recorded may be limited in amplitude by means of manual or automatic "level controllers" to compress their dynamic range. This is done to prevent the record grooves being cut by the recording stylus from running into one another. Since the width of a given groove of the record is dependent upon the amplitude or loudness of the audio signal being recorded in that groove, provision must be made to limit the amplitude of the signal being recorded to insure an adequate spacing between adjacent grooves.

Although variable pitch recording techniques have been devised to vary the spacing between adjacent record grooves in accordance with the amplitude level of the signals being recorded to thereby permit maximum playing time to be obtained for a given record size, a compromise must be made betwen record playing time and the permissible mamimum amplitudes of the signals to be recorded. Accordingly, the limitation of amplitude of audio signals during recording serves to reduce or compress the dynamic range of the recorded performance, so that the finest quality high fidelity systems are incapable of faithfully reproducing the original performance. Similar limitations as to amplitude of signals being recorded are found in magnetic tape recording operations because of "saturation" and "print through" problems. The broadcasting of program material by frequency modultaion radio transmission also utilizes amplitude reducing techniques which reduce the dynamic range of the program being broadcast to prevent transmitter overload and to maintain the radio transmission within the frequency bandwidth prescribed by Federal Communications Commission regulations. Again, the result of these limiting techniques is a loss of realism caused by the reduction of original performance dynamics during reproduction by present-day high fidelity systems.

Accordingly, it is an object of this invention to provide a dynamic sensing arrangement for controlling the gain of high fidelity audio systems in a manner to expand the dynamic range of the audio signals being reproduced, to thereby more faithfully reproduce the original performance.

It is an additional object of this invention to provide a gain control device for high fidelity systems and the like, which gain control device is virtually noiseless in operation and does not introduce distortion or undesirable feedback into the system.

It is an additional object of this invention to provide gain control device for high fidelity systems, which gain control device is adapted to either expand for compress the dynamic range of the audio signals being reproduced.

It is an additional object of this invention to provide a an audio gain control device for high fidelity systems, which device utilizes a novel indicator arrangement to simplify operation of the device by the user thereof.

Briefly, the gain control device of the invention comprises a voltage divider circuit which utilizes a light-dependent resistor as a component thereof. The voltage divider circuit, including the light-dependent resistor, is inserted in the high fidelity system between the audio signal source and the input to the system preamplifier, so that the magnitude of the audio input signals to the preamplifier may be controlled to thereby provide control of the overall gain of the system. A variable light source, such as a neon lamp, for example, is provided to control the resitsance of the light-dependent resistor in accordance with the average level of the audio signals. Since a neon lamp acts as a rectifier, it may be connected to the output of the power amplifier of the high fidelity system to thereby provide a light source which varies in intensity in accordance with the average level of the audio signals. By means of a switching arrangement, the light-dependent resistor can be connected in the voltage divider circuit in a manner to either increase or decrease the magnitude of the signal applied to the preamplifier input in accordance with the average signal level at the output of the power amplifier. Accordingly, the gain control device of the invention may be employed to either expand or compress the dynamic range of the audio signals in the system merely by utilizing the aforesaid switching arrangement. When the gain control device is employed to expand the dynamic range of the audio signals, a goodly portion of the original performance dynamics lost during recording or broadcasting is restored.

Inasmuch as the gain control device of the invention does not utilize electron tubes or transistors, but merely consists of a simple voltage divider arrangement, it provides virtually noiseless operation and does not introduce distortion into the system. Furthermore, since the output of the power amplifier of the system is linked to the input of the preamplifier solely through the transmission of light from the control lamp to the light dependent resistor, undesirable electric signal feedback is avoided. Finally, through the use of a novel arrangement employing lamps similar to the control lamp utilized to control the light-dependent resistor, a simple indicating arrangement is provided which enables a user of the device to speedily and simply adjust the operation of the device to suit the characteristics of a particular high fidelity system.

Figure 2:
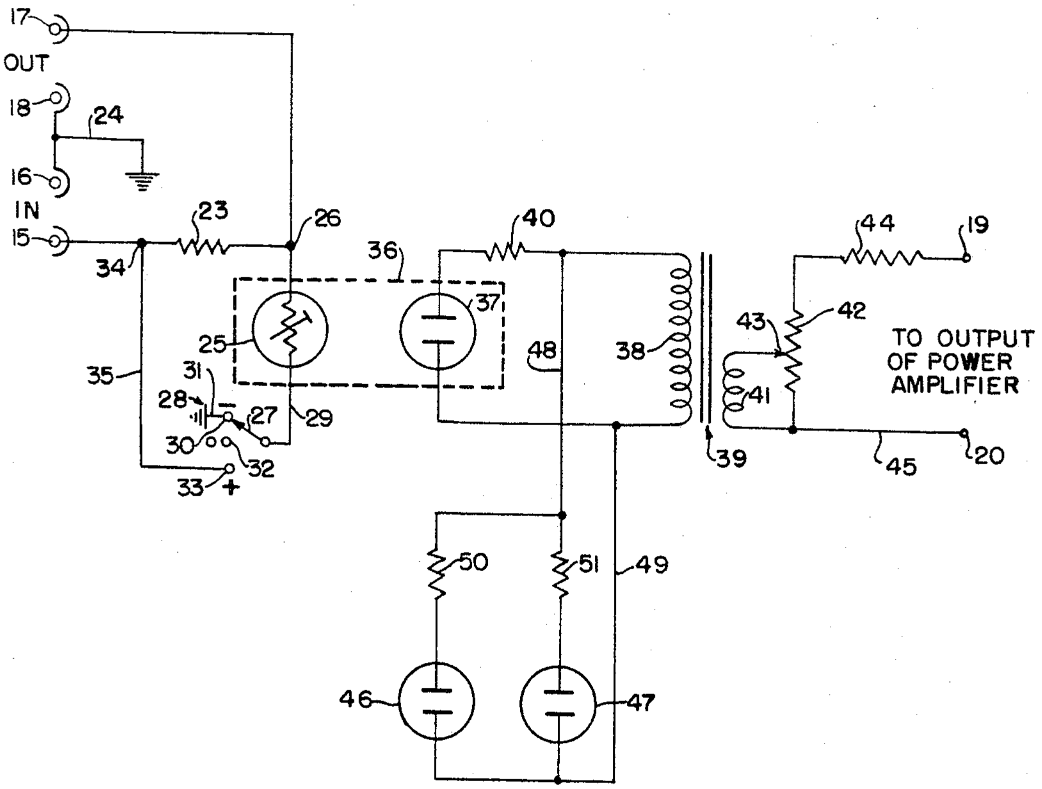

In the drawing:

FIG. 1 is a block diagram of a typical high fidelity system showing the manner in which the gain control device of the invention is connected to the system components; and FIG. 2 is a detailed circuit diagram of the gain control device of the invention.

Referring now to FIG. 1 of the drawing, there is shown a typically high fidelity system comprising a signal source 10, a preamplifier 11, a power amplifier 12, and a loudspeaker 13. The signal source 10 may, for example, comprise a phonograph pickup cartridge for use with a record turntable, a tape head for a magnetic tape recorder, or a tuner for receiving FM radio signals. In the normal operation of such a high fidelity system, the audio signals produced by the signal source 10 are amplified by the preamplifier 11 and the power amplifier 12 to a signal level which is adequate to drive an electroacoustic reproducing device, such as the loudspeaker 13. The gain control device 14 of the invention is shown in FIG. 1 as having its input terminals 15 and 16 connected to receive the output of signal source 10 and its output terminals 17 and 18 connected to the input of preamplifier 11, so that the device is connected in a manner to control the level of the audio signals applied to the input of the preamplifier. The gain control device 14 is controlled in operation by the output of power amplifier 12 by having its control terminals 19 and 20 connected to the output of the power amplifier by leads 21 and 22. From the foregoing description it is believed apparent that the gain control device of the invention is simply and easily inserted into a typical high fidelity system with a minimum of electrical connections.

As seen in FIG. 2 of the drawing, input terminal 15 of the gain control device 14 is connected to output terminal 17 through a resistor 23, while input terminal 16 is connected directly to output terminal 18 and to ground by a lead 24. By virtue of this arrangement, resistor 23 forms a voltage divider circuit with the input resistance of the preamplifier 11. The input resistance (not shown) of the preamplifier would normally appear across terminals 17 and 18. A light-dependent resistor 25, which may be a cadmium sulphide cell, for example, is connected between one end 26 of resistor 23 and a movable switch arm 27 of a switch 28 by means of a lead 29. Switch 28 is a three-position switch having a fixed contact 30 which is connected to ground by means of a lead 31, a fixed contact 32 which is electrically unconnected or "floating," and a fixed contact 33 which is connected to the other end 34 of a resistor 23 by a lead 35.

As mentioned previously, resistor 23 is serially connected between the output of signal source 10 and the input of preamplifier 11, so that it constitutes a voltage divider circuit with the shunt input impedance of the preamplifier 11. When switch arm 27 of switch 28 is connected to contact 30, the light-dependent resistor 25 is connected between end 26 of resistor 23 and ground by means of leads 29 and 31, so that it is effectively in parallel circuit with the preamplifier input resistance. This is the switch position for producing compression of the audio signals in the system and is designated by a "minus" symbol adjacent contact 30. With switch arm 27 connected to fixed contact 32, the light-dependent resistor 25 is not connected in any circuit because contact 32 is a "floating" contact. Accordingly, this neutral switch position is designated by the symbol "0." When switch arm 27 is connected to contact 33, the light-dependent resistor 25 is connected in parallel circuit with resistor 23 by means of leads 29 and 35. This switch position permits expansion of the audio signals in the high fidelity system and is desigated by a "plus" symbol adjacent contact 33.

The characteristics of light-dependent resistor 25 are such that it presents its maximum resistance when it is in total darkness and decreases its resistance as the intensity of light falling upon it increases. Therefore, in order to obtain maximum resistance for the light-dependent resistor 25, it is enclosed in a lightproof enclosure 36 with a control lamp 37. The lightproof enclosure 36 also serves to prevent spurious operation of the gain control device which might be caused by variations in the ambient illumination level during use. Control lamp 37 is a neon lamp of a special type which has a radioactive isotope added to permit firing of the lamp in the total darkness of enclosure 36. A suitable lamp for this purpose would be General Electric type NE2V, for example. Control lamp 37 is energized from the secondary winding 38 of a step-up transformer 39 through a current-dropping resistor 40. The primary winding 41 of transformer 39 is connected across the output of a potentiometer 42. The tap 43 of potentiometer 42 permits adjustment of the voltage level applied to primary winding 41. Potentiometer 42 is connected to the control terminal 19 of the gain control device through a resistor 44 and to the control terminal 20 by a lead 45. Control terminals 19 and 20 are in turn connected to the output of the power amplifier 12 by means of leads 21 and 22 as shown in FIG. 1 of the drawing. The resistor 44 is provided to prevent the potentiometer 42 from overloading the output circuit of the power amplifier 12. An indicating arrangement comprising parallel-connected neon lamps 46 and 47 is connected across the secondary winding 38 of transformer 39 by means of leads 48 and 49. Each of the indicator lamps 46 and 47 is provided with its own dropping resistor, resistors 50 and 51, so that each lamp is in parallel circuit with the control lamp 37 across the secondary winding of transformer 39.

In operation, the voltage applied to control lamp 37 from the output of power amplifier 12 determines the magnitude of the resistance of light-dependent resistor 25, and therefore determines the voltage level of the audio signals applied to the input of preamplifier 11. When switch arm 27 of switch 28 is connected to contact 33, the position for expansion, light-dependent resistor 25 is connected in parallel-circuit with resistor 23. If the control lamp 37 has not fired, resistor 25 presents its maximum resistance, so that the total resistance of parallel-connected resistors 23 and 25 is maximum. As the average level of the output voltage from power amplifier 12 rises, for example during a loud passage of music, the voltage applied to control lamp 37 reaches the threshold level at which the lamp 37 fires and thereby illuminates the light-dependent resistor 25 in enclosure 36. This causes the resistance of the light-dependent resistor to decrease as the average output signal level increases, so that the total resistance presented by parallel-connected resistors 23 and 25 decreases, to thereby apply more signal voltage to the input of the preamplifier 11. The threshold level of voltage at which the control lamp 37 fires may be adjusted by the tap 43 of potentiometer 42, so that when the audio signals at the output of amplifier 12 reach a predetermined average level the lamp 37 fires to start the expansion action and effectively increase the system gain.

It may be noted that neon lamp 37 is a gaseous glow lamp, so that it acts to rectify the AC audio signals appearing at the output of power amplifier 12, to thereby control the resistance of the light-dependent resistor 25 in accordance with the average level of the audio signals. By virtue of this arrangement which permits expansion of the audio signals, the gain control device of the invention serves to compensate for the compression of high level audio signals during the recording or broadcasting process. Since, as previously explained, the level controlling technique is utilized primarily during the recording or broadcasting of exceptionally loud passages, the gain control device of the invention may be set to operate only above a predetermined threshold level of signal at the output of the power amplifier 12. Therefore, the gain control device can be set to effectively sense those high level passages of audio signal which have been subjected to limiting techniques during recording or broadcasting and will compensate for this reduction in average signal level by effectively increasing the gain of the high fidelity system. This action vastly enhances the realism of the reproduced performance and does so without introducing distortion or noise in the gain controlling process. Furthermore, since the output of the power amplifier 12 is linked to the input of preamplifier 11 solely by the light transmitted from control lamp 37 to light-dependent resistor 25, the input and output of the amplifier are electrically isolated to prevent undesirable electric signal feedback and noise.

The disclosed device many also be used to effect signal compression by merely moving switch arm 27 to fixed contact 30, so that the light-dependent resistor 25 is connected to shunt the input of preamplifier 11. Since the light-dependent resistor is now in parallel circuit with the input resistance of the preamplifier 11 a decrease in the value of resistance of the light-dependent resistor will decrease the total resistance of that portion of the voltage divider formed by the parallel-connected light-dependent resistor and input resistance of the preamplifier. Accordingly, as the average signal level of the output signals from power amplifier 12 rise, the intensity of the light from control lamp 37 increases, to thereby decrease the resistance of light-dependent resistor 25 and decrease the amplitude of the audio signal applied to the input of preamplifier 11. Since the signal level applied to the input of preamplifier 11 decreases as the average signal level at the output of power amplifier 12 increases, the action is a compression of the dynamic signal range to minimize high level passages. Again, the threshold level at which compression starts may be determined by the setting of potentiometer 42. Although this compression action may be considered to degrade the performance of the high fidelity reproducing system, it may be desirable under some circumstances to smooth out the listening levels for what might be called "background listening." Additionally, compression may be utilized in cases where the ambient noise level of a listening area is particularly high. In this case it may be desirable to compress or reduce the high level audio signals so that the lower level signals can be ampified to a greater extent to be heard above the background noise, thereby to achieve an average listening level that is not annoying to adjacent listening areas. Finally, it may be noted that the gain control device of the invention may be rendered inoperative by moving switch arm 27 to switch contact 32, so that the light-dependent resistor 25 is not connected in the input circuit to the preamplifier 11.

Indicator lamps 46 and 47 are provided to aid the user of the gain control device of the invention in adapting the operation of the device to a particular high fidelity system. Since indicator lamp 46 and 47 are electrically connected in parallel circuit with control lamp 37, they are energized by the same voltage level used to control the control lamp 37 and thereby accurately reflect the operating conditions of the circuit. Accordingly, lamp 46 may be a neon lamp having the same characteristics as the control lamp 37. For example, lamp 46 could be a General Electric type NE2E which is substantially the same as the General Electric type NE2V lamp employed as the control lamp, except that the presence of a radio active isotope is not necessary since lamp 46 is exposed to the ambient illumination level of the area in which the gain control device is used. By virtue of this arrangement indicator lamp 46 may be employed by the user of the gain control device of the invention to visually observe the performance of the gain control device in expanding or compressing the dynamic range of the audio signals in the system. The user of the gain control device need only to observe indicator lamp 46 to determine the threshold level at which the gain control device begins to operate. This action, coupled with adjustment of the threshold level by means of potentiometer 42, permits the user to adapt operation of the gain control device to a particular high fidelity system.

Indicator lamp 47 is a neon lamp similar to indicator lamp 46, except that it is designed to fire at a higher voltage. For example, the indicator lamp 47 may be a General Electric type NE2H. The firing voltage of this lamp may be such that it will fire when the combination of control lamp 37 and light-dependent resistor 25 are exercising maximum control over the signal level, so that the lighting of indicator lamp 47 provides a visual indication that a further increase of the control voltage by means of potentiometer 42 would not produce an increased expansion or compression in the system. Accordingly, the user of the gain control device need only observe indicator lamps 46 and 47 to determine the correct setting of potentiometer 42. It may be noted that should the signal level be increased further than warranted through faulty adjustment of potentiometer 42, the operation of the gain control device would not be affected and the device will not introduce any distortion into the system because of such faulty adjustment.

For a preamplifier input impedance of 47,000 ohms, the input resistor 23 may be a 47,000 ohm resistor to provide an original insertion loss of 6 db in the system. This insertion loss constitutes a reduction of the audio signal from signal source 10 applied to the input of the preamplifier 11 by about 50%. During operation of the gain control device to expand the dynamic range of the audio signals, the amplifier gets more input signal because the voltage divider is no longer cutting the available signal level by 50% but is reducing it by only a few percent. In other words, the gain control device of the invention controls the overall gain of the system by introducing an initial insertion loss in the system, which loss is decreased during expansion to provide an increased system gain. With the circuit parameters and types of control and indicator lamps previously given, the following values of the remaining circuit components have been found to be satisfactory. Resistors 40, 50 and 51 may each comprise a 47,000 ohm resistor. Step-up transformer 39 may have a ratio of 200:1. Potentiometer 42 may be a 25 ohm, 2 watt potentiometer and resistor 44 may be a 1 watt, 3.3 ohm resistor. While lamps other than neon lamps could be employed for the control and indicator lamps in the gain control device, it is preferable to utilize lamps of the gaseous glow type to provide a fast "attack time" for the device.

Although the gain control device of the invention has been shown in a monophonic high fidelity system comprising but a single channel, it is obvious that the device is equally well suited for use in stereophonic systems wherein two or more channels are employed. In this case, separate gain control devices, which may be identical in construction, may be employed for each channel of the stereophonic system. If desired, of course, the separate devices may be included in a common housing or enclosure. Similarly, it is believed apparent that the gain control device disclosed herein may be utilized for applications other than high fidelity reproducing systems. For example, the gain control device could be used for controlling the level of audio signals during phonograph or tape recording and other similar applications.

It is believed apparent that many changes could be made in the abovedescribed gain control device and many seemingly different embodiments of the invention constructed without departing from the scope thereof. Accordingly, it is intended that all matter contained in the above description, or shown in the accompanying drawing, shall be interpreted as illustrative and not in a limiting sense.

We claim:

1. In a high fidelity audio system having an audio signal source and an amplifier with input impedance means for amplifying the audio signals from said source, a gain control device for expanding the dynamic range of the audio signals in said system, said device comprising light-responsive circuit means coupled between the output of said audio signal source and the input of said amplifier for controlling the voltage level of the audio signals applied to said amplifier from said source in response to variations in light intensity, said circuit means including a light-responsive impedance element connected in series with the input impedance means of said amplifier to increase the voltage level of the audio signals applied to the amplifier input impedance means in accordance with increasing values of light intensity, and a variable intensity light source coupled to the output of said amplifier for controlling said impedance element in response to the average signal level of the audio signals at the output of said amplifier, the intensity of the light from said light source being increased with increases in the average signal level of the audio signals at the amplifier output whereby said device functions to increase the gain of the audio system with increasing values of average audio signal level, to thereby expand the dynamic range of the audio signals in the system.

2. A gain control device as claimed in claim 1, wherein said light-responsive impedance element comprises a light-dependent resistor and said variable intensity light source comprises a gaseous glow lamp of the type adapted to rectify the audio signals applied thereto from the output of the amplifier, said resistor and said lamp being enclosed in a lightproof enclosure.

3. In a high fidelity audio system having an audio signal source and an amplifier for amplifying the audio signals from said source, a gain control device for controlling the dynamic range of the audio signals in said system, said device comprising a voltage divider circuit coupled between the output of said audio signal source and the input of said amplifier for controlling the voltage level of the audio signals applied to said amplifier from said source, said circuit comprising a resistor serially coupled between the output of said signal source and the input of said amplifier, a light-dependent resistor, and switch means having a first switch position for connecting said light-dependent resistor to shunt said first-named resistor and a second switch position for connecting said light-dependent resistor to shunt the input to said amplifier; a gaseous glow control lamp of the type adapted to rectify audio signals applied thereto; a lightproof enclosure enclosing said light-dependent resistor and said control lamp; and coupling circuit means for coupling said control lamp across the output of said amplifier for energization thereby, whereby with said switch means in said first switch position an increase in the average signal lever of the audio signals at the amplifier output causes an increase in the voltage level of the audio signals applied to the amplifier input, to thereby increase the gain of the system and expand the dynamic range of the audio signals, and with said switch means in said second position an increase in the average signal level of the audio signals at the amplifier output causes a decrease in the voltage level of the audio signals applied to the amplifier input, to thereby decrease the gain of the system and compress the dynamic range of the audio signals.

4. A gain control device as claimed in claim 3, wherein said coupling circuit means comprises a step-up transformer and a potentiometer, the secondary of said transformer being coupled across said control lamp and the primary of said transformer being coupled across the output of said amplifier through said potentiometer, so that adjustment of said potentiometer adjusts the threshold level of audio signals at which said control lamp fires, to thereby permit adjustment of the audio signal level at which the gain controlling action starts.

5. A gain control device as claimed in claim 4, further comprising first and second gaseous glow indicator lamps coupled in parallel circuit with said control lamp across the secondary of said transformer and arranged exteriorly of said enclosure, said first indicator lamp having substantially the same firing voltage as said control lamp, to thereby provide a visual indication of the audio signal level at which the gain controlling action starts, said second indicator lamp having a firing voltage substantially equal to that value of voltage applied to said control lamp at which further increases of voltage produce substantially no change in the controlling action of the control lamp with respect to the light-dependent resistor, to thereby provide a visual indication of the operating point of the device at which the gain controlling action is maximum.

6. An expander circuit for operation in a system including an amplifier whose input is connected in series with a signal source by an input impedance means, said expander circuit comprising: a control lamp, coupling circuit means electrically connected between said signal source and said control lamp for energizing said control lamp to control its output illumination in accordance with the amplitude of the signal from the signal source, a light-dependent resistor located in a light receiving relationship with respect to said control lamp, said light-dependent resistor having a decreasing resistance in response to an increased illumination output of said control lamp impinging thereon, and means for connecting said light-dependent resistor in shunt with said input impedance means, an increase in the amplitude of the signal from said signal source producing a resultant increase in the illumination output of said control lamp and a consequent decrease in the resistance of said light-dependent resistor whereby the amplitude of the input signal from said source to said amplifier is increased resulting in an expansion of the dynamic range of said amplifier.

7. An expander-compressor circuit for operation in a system including an amplifier whose input is connected to a signal source by an input impedance means, said compressor-expander circuit comprising: a control lamp, a light-dependent resistor located in a light receiving relationship with respect to said control lamp, said light-dependent resistor changing its resistance in response to the amount of light from said lamp impinging thereon, coupling circuit means electrically connected between said signal source and said control lamp for energizing said control lamp to control its output illumination in accordance with the amplitude of the signal from the signal source, and means for selectively connecting said light-dependent resistor in first and second positions with respect to said input impedance means and the input of said amplifier, a variation in the amplitude of the signal from said signal source in one direction and the resultant variation in the output illumination of said lamp producing a change in the resistance of said light-dependent resistor to produce an increase in the amplitude of the signals from the source applied to the input of said amplifier with said light-dependent resistor connected in one of said positions and a decrease in the amplitude of the signals from the source applied to the input of said amplifier with said light-dependent resistor connected in the other of said positions, whereby the dynamic range of said amplifier is respectively expanded and compressed.

8. An expander-compressor circuit for operation in a system including an amplifier whose input is electrically connected to a signal source by an input impedance means connected to the input of said amplifier comprising: a control lamp, a light-dependent resistor located in a light receiving relationship with respect to said control lamp, said light-dependent resistor having a decreasing resistance in response to an increased illumination output of said control lamp impinging thereon, coupling circuit means electrically connected between said signal source and said control lamp for energizing said control lamp to control its output illumination in accordance with the amplitude of the signal from the signal source, and means for selectively connecting said light-dependent resistor in a first position in shunt with said input impedance means and in a second position in series with said input impedance means of said amplifier, an increase in the amplitude of the signal from said signal source producing a resultant increase in the output illumination of said control lamp and an increase in the amplitude of the signal from the source applied to the input of said amplifier with said light-dependent resistor connected in one of said two positions and a decrease in the amplitude of the signal from the source applied to the input of said amplifier with said light-dependent resistor connected in the other of said positions.

9. An expander-compressor circuit as set forth in claim 7 wherein said coupling circuit means is connected between the output of said amplifier and said control lamp.

10. An expander-compressor circuit as set forth in claim 8 wherein said coupling circuit means is connected between the output of said amplifier and said control lamp.

11. An expander-compressor circuit as set forth in claim 8 wherein said input impedance means includes the input impedance of said amplifier and a resistor means is connected to said input impedance means, said light-dependent resistor being connected in shunt with said resistor and in series with said input impedance means when the circuit operates as an expander and in series with said resistor means and in shunt with said input impedance means when said circuit operates as a compressor.

12. Apparatus for modifying the dynamic range of an electrical signal comprising: a first electrical circuit through which said electrical signal is conducted, said circuit having an input circuit and an output circuit including an output resistance, a source of luminous energy, a second electrical circuit having an input circuit to which said electrical signal is applied, said second electrical circuit having an output circuit connected to said source for variably controlling the intensity of the luminous energy radiated by said source as a generally smooth continuous function of the amplitude level of said electrical signal over a substantial range of amplitude levels thereof, a light-sensitive resistor positioned in light-receiving relationship with said source, said light-sensitive resistor having a resistance which varies as a function of the intensity of the luminous energy impinging thereon, said light-sensitive resistor being connected in said first electrical circuit to vary the conductivity thereof as a function of said intensity, and a switch having first and second positions connected in said first electrical circuit and adapted, when in said first position, to place said light-sensitive resistor in parallel with said output resistance and, when in said second position, to place said light-sensitive resistor in series with said output resistance, whereby said electrical circuits function, with said switch in said first position, to compress the dynamic range of the electrical signal conducted through said first electrical circuit and, with said switch in said second position, to expand the dynamic range of the electrical signal conducted through said electrical circuit.

13. Apparatus as set forth in claim 12 in which said second electrical circuit includes means for amplifying the electrical signal applied to the input circuit of said second electrical signal, said amplifying means being interconnected between the input and output circuits of said electrical circuit, and said second electrical circuit further includes means for varying the amount of compression or expansion caused by said electrical circuits.

14. Apparatus for modifying the dynamic range of an electrical signal comprising: a first electrical circuit through which said electrical signal is conducted, said circuit having an input circuit and an output circuit including an output resistance, a source of luminous energy, a second electrical circuit having an input circuit to which said electrical signal is applied, said second electrical circuit having an output circuit connected to said source for variably controlling the intensity of the luminous energy radiated by said source as a generally smooth continuous function of the amplitude level of said electrical signal over a substantial range of amplitude levels thereof, a light-sensitive resistor positioned in light-receiving relationship with said source, said light-sensitive resistor having a resistance which varies as a function of the intensity of the luminous energy impinging thereon, said light-sensitive resistor being serially connected with said output resistance thereby to vary the conductivity of said first electrical circuit as a function of said intensity, wherein, the conductivity of said network is less for low amplitude signals than for higher amplitude signals, whereby the dynamic range of the electrical signal appearing at the output circuit of said first electrical circuit is expanded relative to that of the electrical signal applied to the input circuit of said first electrical circuit.

15. Apparatus as set forth in claim 14 wherein said second electrical circuit includes means for amplifying the electrical signal applied to the the input circuit of said second electrical circuit, said amplifying means being interconnected between the input and output circuits of said second electrical circuit, and said second electrical circuit further includes means connected with said input circuit thereof for adjustably varying the amount of dynamic range expansion.

16. In a system for amplifying an audio-frequency electrical signal, said system including a pre-amplifier and a power amplifier, apparatus for modifying the dynamic range of said audio-frequency signal comprising: a first electrical circuit adapted to be connected in said system for attenuating said audio-frequency signal, said circuit having an input circuit and an output circuit including an output resistance, a source of luminous energy, a second electrical circuit having an input circuit connected to the input circuit of said first electrical circuit and including means for amplfying the audio-frequency signal applied thereto, said second electrical circuit having an output circuit connected to said source for variably controlling the intensity of the luminous energy radiated by said source as a generally smooth continuous function of the amplitude level of said audio-frequency signal over a substantial range of amplitude levels thereof, said second electrical circuit further including a biasing means for establishing a threshold current through the filament of said luminous energy source and a corresponding threshold illumination level of said source, a light-sensitive resistor positioned in light-receiving relationship with said source, said light-sensitive resistor having a resistance which varies as a function of the intensity of the luminous energy impinging thereon, said light-sensitive resistor being connected in said first electrical circuit to vary the amount of attenuation introduced thereby as a function of said intensity, a switch having first and second positions connected in said first electrical circuit and adapted, when in said first position, to place said light-sensitive resistor in parallel with said output resistance and, when in said second position, to place said light sensitive resistor in series with said output resistance, whereby said electrical circuits function, with said switch in said first position, to compress the dynamic range of the electrical signal conducted through said first electrical circuit and, with said switch in said second position, to expand the dynamic range of the electrical signal conducted through said first electrical circuit, said second electrical circuit including means for adjustably varying the amount of dynamic range modification.

17. In an audio-frequency amplifying system as set forth in claim 16, said apparatus further including means for connecting the output circuit of said first electrical circuit to said preamplifier.

References Cited

UNITED STATES PATENTS

| | | | |
|---|---|---|---|
| 2,358,045 | 9/1944 | Barney | 333—14 |
| 3,020,488 | 2/1962 | Miranda et al. | 330—59 |
| 3,182,271 | 5/1965 | Aiken | 330—59 X |
| 3,185,936 | 5/1965 | Fuller | 330—59 |
| 3,213,391 | 10/1965 | Kovalevski et al. | |
| 3,258,707 | 6/1966 | Lawrence | 330—59 |

NATHAN KAUFMAN, *Primary Examiner.*

U.S. Cl. X.R.

29—596, 602; 242—118.8; 250—214; 330—129; 336—198, 208; 310—216